Patented July 13, 1926.

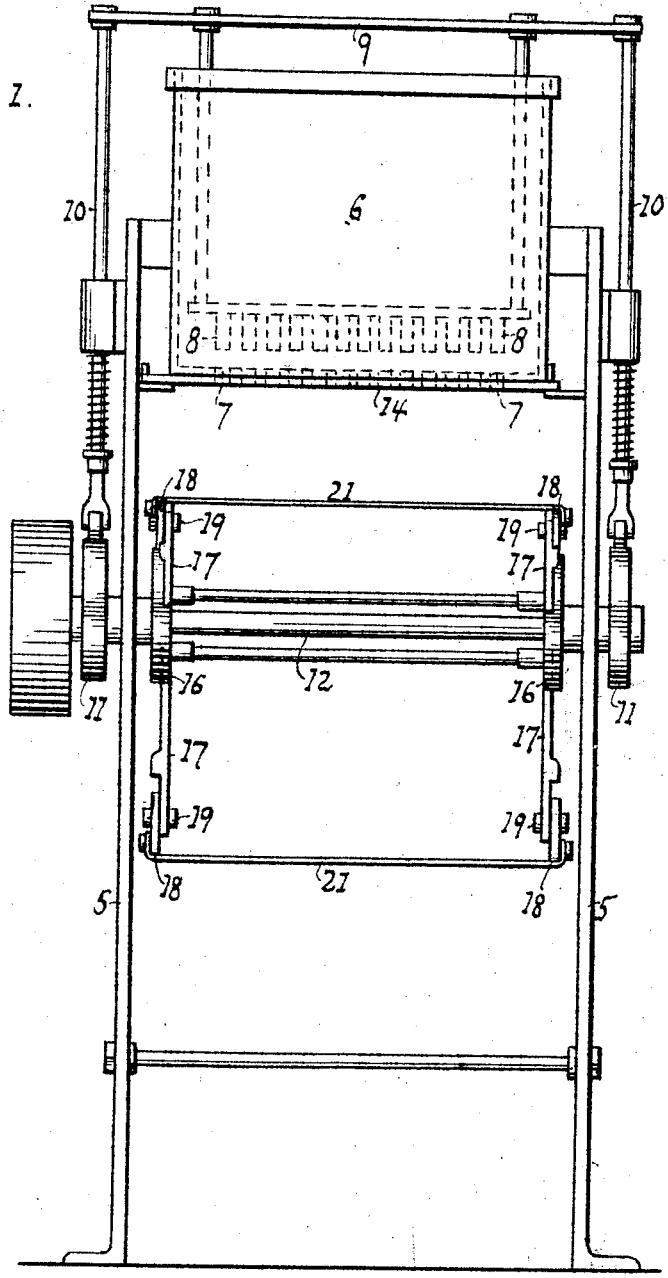

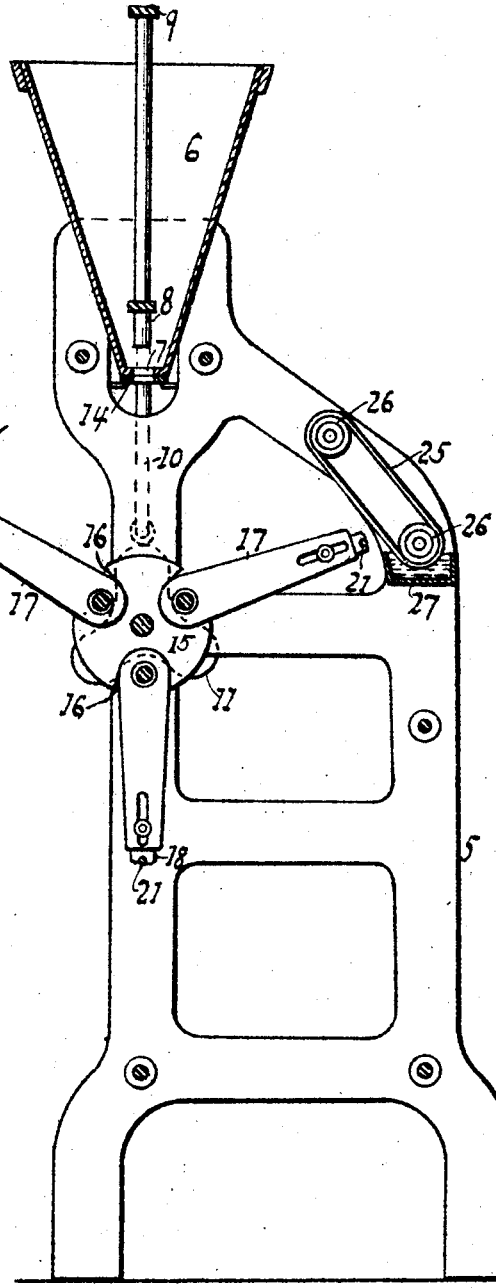

1,592,330

UNITED STATES PATENT OFFICE.

LOUIS BLUMENTHAL, OF BROOKLYN, NEW YORK.

DOUGH-CUTTING MACHINE.

Application filed June 1, 1925. Serial No. 33,903.

This invention relates to a machine for cutting dough which drips through a row of holes in a hopper and is severed by a rotary cutter arranged below the hopper.

The invention is designed to provide a device having rocking arms and a knife mounted on the arms made to shake loose the particles of dough sticking to the knife after cutting the dough.

An object of the invention is to provide sliding devices on the arms for adjusting the cutters to or from the axis of revolution.

Another object of the invention is to provide a lubricating device adapted to wipe against the knives as they sweep by so that none of the dough will adhere to them.

The invention resides more particularly in the novel combinations hereinafter described and claimed, reference being made to the accompanying drawings in which:—

Fig. 1 represents a front elevation of a machine embodying this invention.

Fig. 2 is a vertical central section of the same.

Fig. 3 is a detailed perspective view of a knife holder.

In the drawing the numeral 5 designates a frame formed of two sides bolted together and a hopper 6 is fixed to the upper portion between the frames. The hopper is adapted to contain the semi-liquid dough so that it will slowly drip from a row of holes 7 located in the bottom of the hopper. A series of pins 8 depend from a head 9 and said head is connected to plungers 10 extending down on each side of the frame. These plungers are actuated by cams 11 fixed to a driving shaft 12 and supported in the frame. The pins are forced into the holes in the hopper while the dough is cut so as to clean them for the next supply of dough. A sliding gate 14 is arranged under the hopper to at times close the openings.

A pair of disks 15 one being opposite the other are secured to the shaft. Each disk has a series of recesses 16 and an arm 17 is pivoted to the disk adjacent the recess. The recess permits the arm to rock a predetermined distance depending on the play room of the pivoted end of the arm in conjunction with the recess, see Fig. 2. The arm has a head member 18 clamped to the arm by means of a bolt 19 coacting with the member and a slot 20 in the arm. The member is fixed to the arm when the bolt is tightened but when it is desired to move the member up or down the nut on the bolt is loosened. A cutting device 21 such as a wire is stretched across from one to the opposite member, and the ends of the wire are fastened to studs 22 fixed to the members. The wire sets in a groove 24 as indicated in Fig. 3 in the top of the member 18 so as to prevent displacement when cutting.

Each wire in its rotation in the direction of the arrow brushes against an endless belt 25 rotatively engaged by rollers 26 covered with felt to absorb moisture. One of the rollers is immersed in a trough 27 containing a liquid such as cotton seed oil or grease. In wiping against the belt before it reaches the hopper the wire cutter receives a coating of grease so that none of the dough will stick to the wire. The cutter by its movement against the belt as it sweeps by moves the belt in the same direction as the arc of rotation of the cutter thus bringing a different portion of the belt to contact with each succeeding cutter.

As indicated in the drawing, each pair of arms have a certain amount of play room in the recesses thus when a knife is cutting the dough it swings backward until the arms are stopped by striking against the rear wall of the recess. The arms in their rotation after cutting the dough begin to gravitate until they strike the opposite walls of the recesses thereby shaking the wire cutter to throw off any particles of dough sticking on the wire.

I claim:—

1. A dough cutting machine comprising a hopper to feed a quantity of dough, a pair of rocking arms rotatively mounted below the hopper one opposite the other, and a cutter carried by the arms.

2. A dough cutting machine comprising a hopper to feed a quantity of dough, a pair of rocking arms rotatively mounted below the hopper one opposite the other, and an adjustable cutter carried by the arms.

3. A dough cutting machine comprising a hopper having a number of holes in its bottom to feed a quantity of dough, a pair of rocking arms rotatively mounted below the hopper one opposite the other, and a cutter adjustable to or from the axis of revolution stretched across the arms.

4. A dough cutting machine comprising a hopper adapted to feed a quantity of dough, a pair of arms rotatively mounted below the hopper, a cutter carried by the arms, and a movable device operated by the rotary means for lubricating the cutter.

5. A dough cutting machine comprising a hopper adapted to feed a quantity of dough, a pair of arms rotatively mounted below the hopper, a cutter carried by the arms, and means including an endless belt moved by the rotary arms for lubricating the cutter.

6. A dough cutting machine comprising a hopper having a row of holes in its bottom to feed a quantity of dough, a pair of disks rotatively mounted below the hopper one opposite the other, a pair of arms rockingly mounted on the disks, a cutter carried by the arms, and plungers having a row of pins for coaction with the holes.

In testimony whereof I have hereunto set my hand.

LOUIS BLUMENTHAL.